(12) United States Patent
Carlstrom, Jr. et al.

(10) Patent No.: US 10,615,445 B2
(45) Date of Patent: Apr. 7, 2020

(54) FUEL CELL STACK

(71) Applicant: PLUG POWER INC., Latham, NY (US)

(72) Inventors: Charles M Carlstrom, Jr., Saratoga Springs, NY (US); Michael Anthony Cacioppo, Cohoes, NY (US); James D'Aleo, Clifton Park, NY (US); Charles Elder, Averill Park, NY (US)

(73) Assignee: PLUG POWER INC., Latham, NY (US)

( * ) Notice: Subject to any disclaimer, the term of this patent is extended or adjusted under 35 U.S.C. 154(b) by 0 days.

(21) Appl. No.: 15/969,876

(22) Filed: May 3, 2018

(65) Prior Publication Data
US 2019/0341644 A1    Nov. 7, 2019

(51) Int. Cl.
*H01M 8/248* (2016.01)
(52) U.S. Cl.
CPC ................... *H01M 8/248* (2013.01)
(58) Field of Classification Search
CPC .................................................... H01M 8/248
See application file for complete search history.

(56) References Cited

U.S. PATENT DOCUMENTS

| 2002/0086199 A1* | 7/2002 | Gibb | ................. F16F 1/377 429/470 |
|---|---|---|---|
| 2003/0203270 A1 | 10/2003 | Rock | |
| 2013/0130148 A1* | 5/2013 | Haltiner, Jr. | .......... H01M 8/248 429/470 |

FOREIGN PATENT DOCUMENTS

GB          2501700 A       11/2013

OTHER PUBLICATIONS

International Search Report of PCT/US2019/030328 dated Jul. 10, 2019.

* cited by examiner

*Primary Examiner* — Jimmy Vo
(74) *Attorney, Agent, or Firm* — Heslin Rothenberg Farley & Mesiti P.C.; Victor A. Cardona, Esq.

(57) ABSTRACT

A fuel cell stack includes an endplate assembly having a structural endplate. An insulator plate has a second exterior surface contacting a first interior surface of the structural endplate and a second interior surface on an opposite side of the insulator plate. A third plate has a third exterior surface contacting the second interior surface and a third interior surface on an opposite side of the third plate relative to the insulator plate. The third interior surface and third exterior surface are substantially flat. The second interior surface and the third exterior surface contact each other substantially continuously in a longitudinal direction and a lateral direction, and are flat and substantially parallel to each other. The second exterior surface is contoured such that the second exterior surface is not flat and is substantially non-parallel relative to the third interior surface.

6 Claims, 12 Drawing Sheets

(MEA Omitted)

FUEL CELL STACK

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically. Such a series of connected multiple fuel cells is referred to as a fuel cell stack. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

The stack must be compressed to provide a desirable amount of GDL compression and minimize a potential for leakage of fuel cell fluids. Stacks may be assembled to provide such compression such that the components thereof (e.g., endplate, insulators, membrane electrode assemblies, gaskets, separator plates, electrical connectors and collector plates) are connected to each other via several fasteners (e.g., bolts). Such fasteners provide localized loading pressures on the components, such as on a structural endplate portion of an endplate assembly.

Typically endplate components, such as a structural endplate located at the outermost end of the assembly, needs to be relatively high in weight and volume to limit a maximum deflection in response to the compression and localized fasteners holding a fuel cell stack together. Such desired small deflection allows the fasteners to hold the other components in properly positioned such that any leaks of fluids are minimized and the components, and assembly, function as intended.

Thus, there is a need for improved fuel cell systems and improved methods of manufacturing fuel cells that efficiently connect and arrange component parts of a fuel cell to each other.

SUMMARY OF THE INVENTION

The present invention provides, in a first aspect, an endplate assembly of a fuel cell system which includes a structural endplate having a first exterior surface and a first interior surface located on an opposite side of the endplate relative to the first exterior surface. An insulator plate has a second exterior surface contacting the first interior surface of the structural endplate and second interior surface on an opposite side of the insulator plate relative to the second exterior surface. A third plate has a third exterior surface contacting the second interior surface and a third interior surface on an opposite side of the third plate relative to the insulator plate. The third interior surface and third exterior surface are substantially flat such that the third interior surface and the third exterior surface are about parallel to each other. The second interior surface and the third exterior surface contact each other substantially continuously in a longitudinal direction and a lateral direction such that the second interior surface and the third exterior surface are flat and substantially parallel to each other. The second exterior surface is contoured such that the second exterior surface is not flat and is substantially non-parallel relative to the third interior surface.

The present invention provides, in a second aspect, a method for forming a fuel cell endplate system which includes performing a finite element analysis on a first fuel cell endplate system of a fuel cell stack having a structural endplate, an insulator plate, and a third plate secured to each other by a plurality of fasteners applied to the structural endplate to provide a desired compression to the fuel cell stack to determine stresses on the fuel cell endplate system. A second insulator plate is formed to conform to contours found by the finite element analysis on the structural endplate such that an exterior surface of the second insulator plate has a shape that conforms to an interior surface of the structural endplate. A second endplate assembly is assembled by securing the structural endplate, the second insulator plate, and the third plate by a second plurality of fasteners applied to the structural endplate.

The present invention provides, in a third aspect, a method for forming a fuel cell endplate system which includes assembling an endplate assembly by connecting a structural endplate, a second insulator plate, and a third plate to each other by a plurality of fasteners applied to the structural endplate. The structural endplate has a first exterior surface and a first interior surface located on an opposite surface of the endplate relative to the first exterior surface. The insulator plate has a second exterior surface contacting the first interior surface of the structural endplate and a second interior surface on an opposite surface of the insulator plate relative to the second exterior surface. The third plate has a third exterior surface contacting the second interior surface and a third interior surface on an opposite side of the third plate relative to the insulator plate. The third interior surface and the third exterior surface are substantially flat such that the third interior surface and the third exterior surface are about parallel to each other. The second interior surface and the third exterior surface contact each other substantially continuously in a longitudinal direction and in a lateral direction such that the second interior surface and the third exterior surface are flat and substantially parallel to each other. The second exterior surface is contoured such that the second exterior surface is not flat and is substantially non-parallel relative to the third interior surface.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
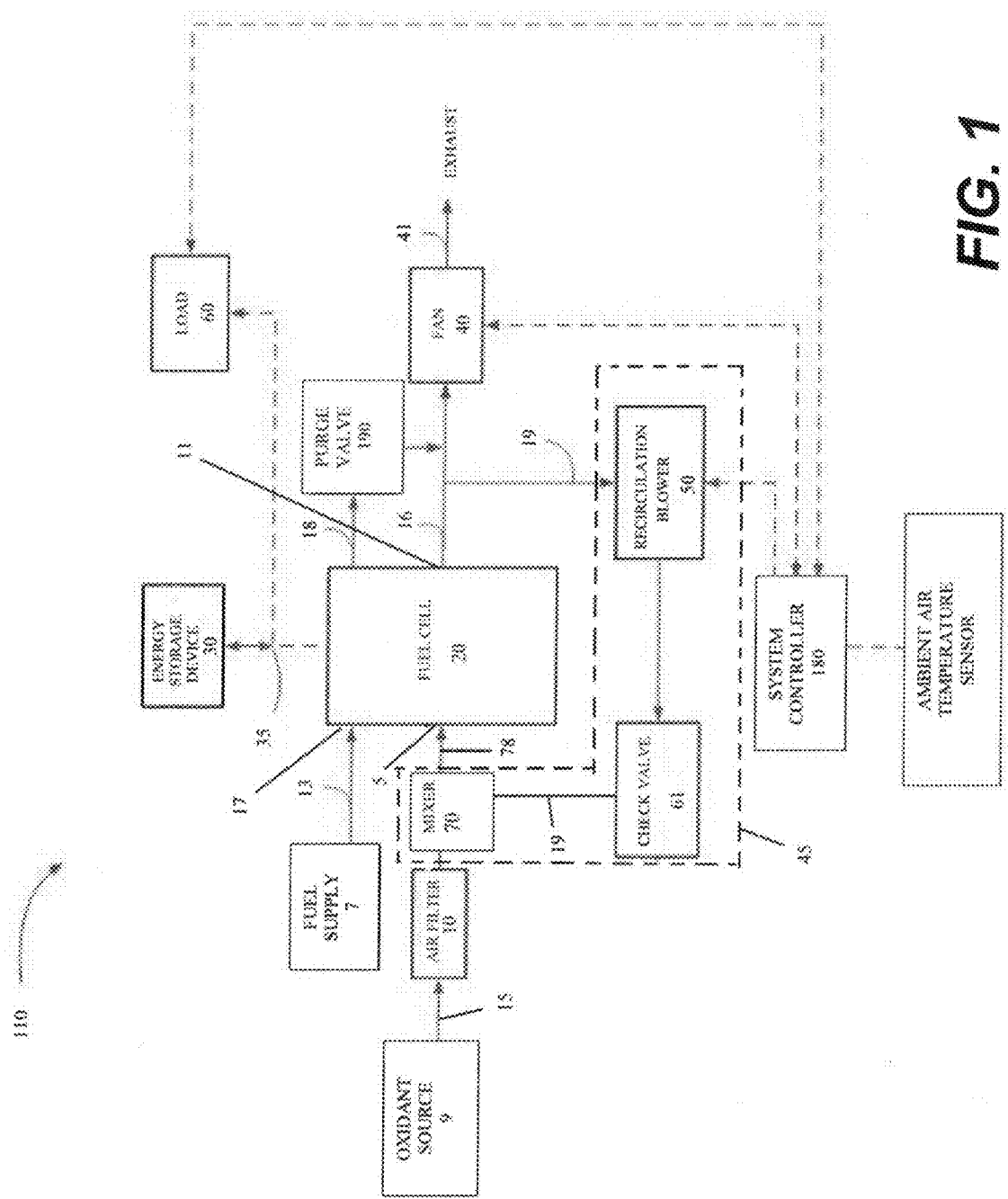
FIG. 1 is a block diagram of a fuel cell system in accordance with the invention.

In an example depicted in FIG. 1, a fuel cell system 10 is referred to as the assembled, or complete, system which functionally together with all parts thereof produces electricity and typically includes a fuel cell stack 20 and an energy storage device 30. The fuel cell is supplied with a fuel 13, for example, hydrogen, through a fuel inlet 17. Excess fuel 18 is exhausted from the fuel cell through a purge valve 190 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
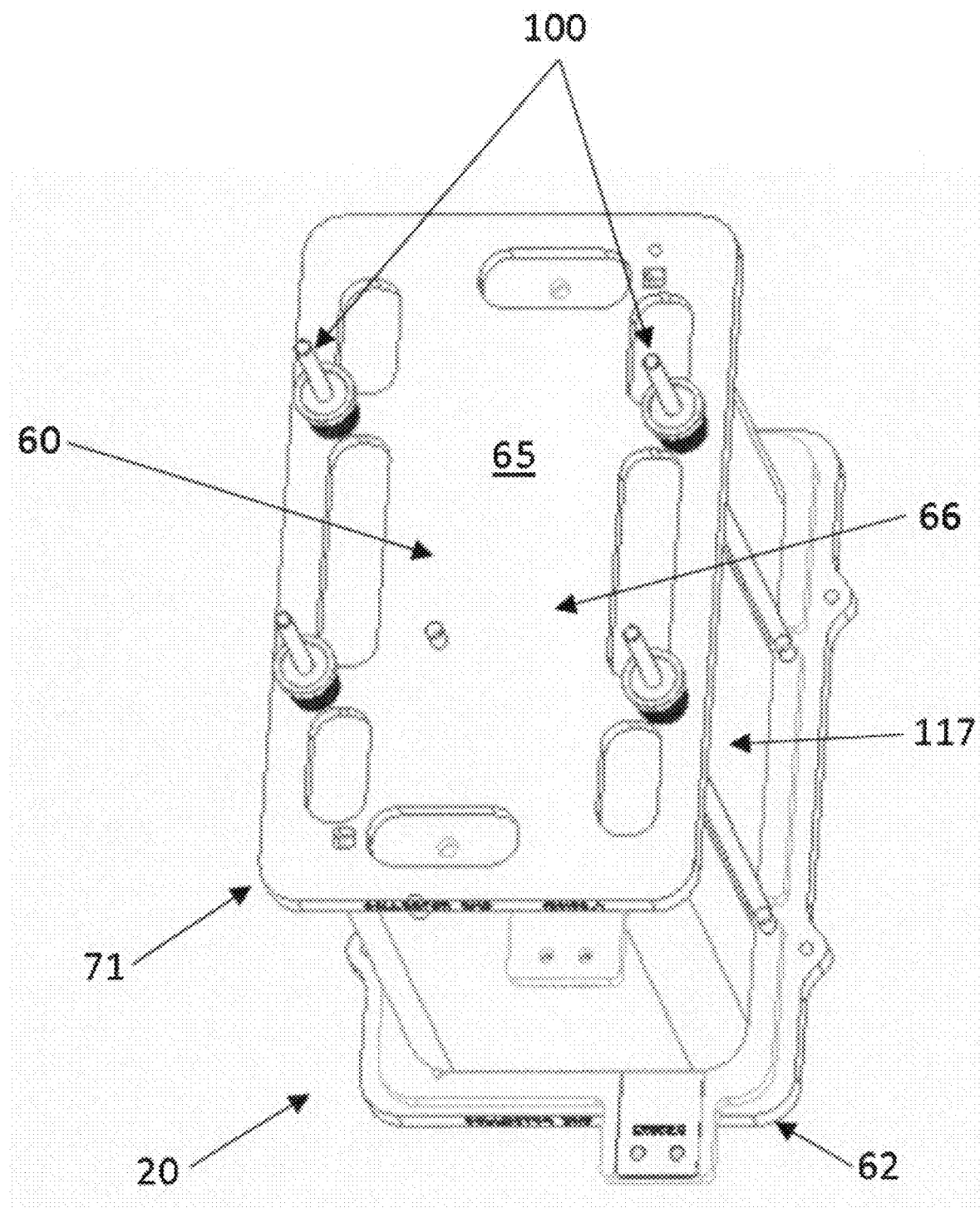
FIG. 2 is perspective view of the fuel cell stack of FIG. 1 with a cover removed.
Figure 3:
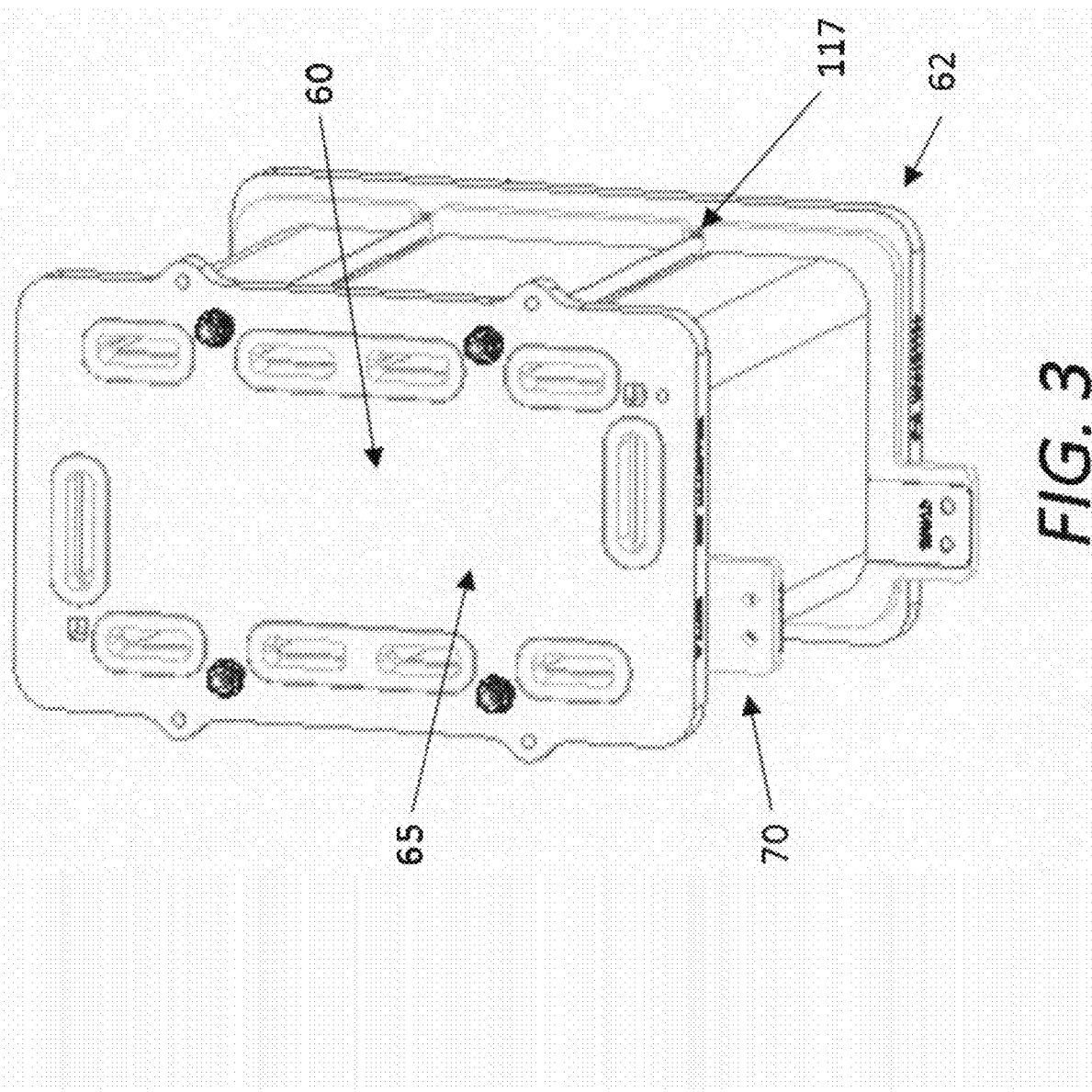
FIG. 3 is a perspective view of an opposite side of the fuel cell stack of FIG. 2.
Figure 4:
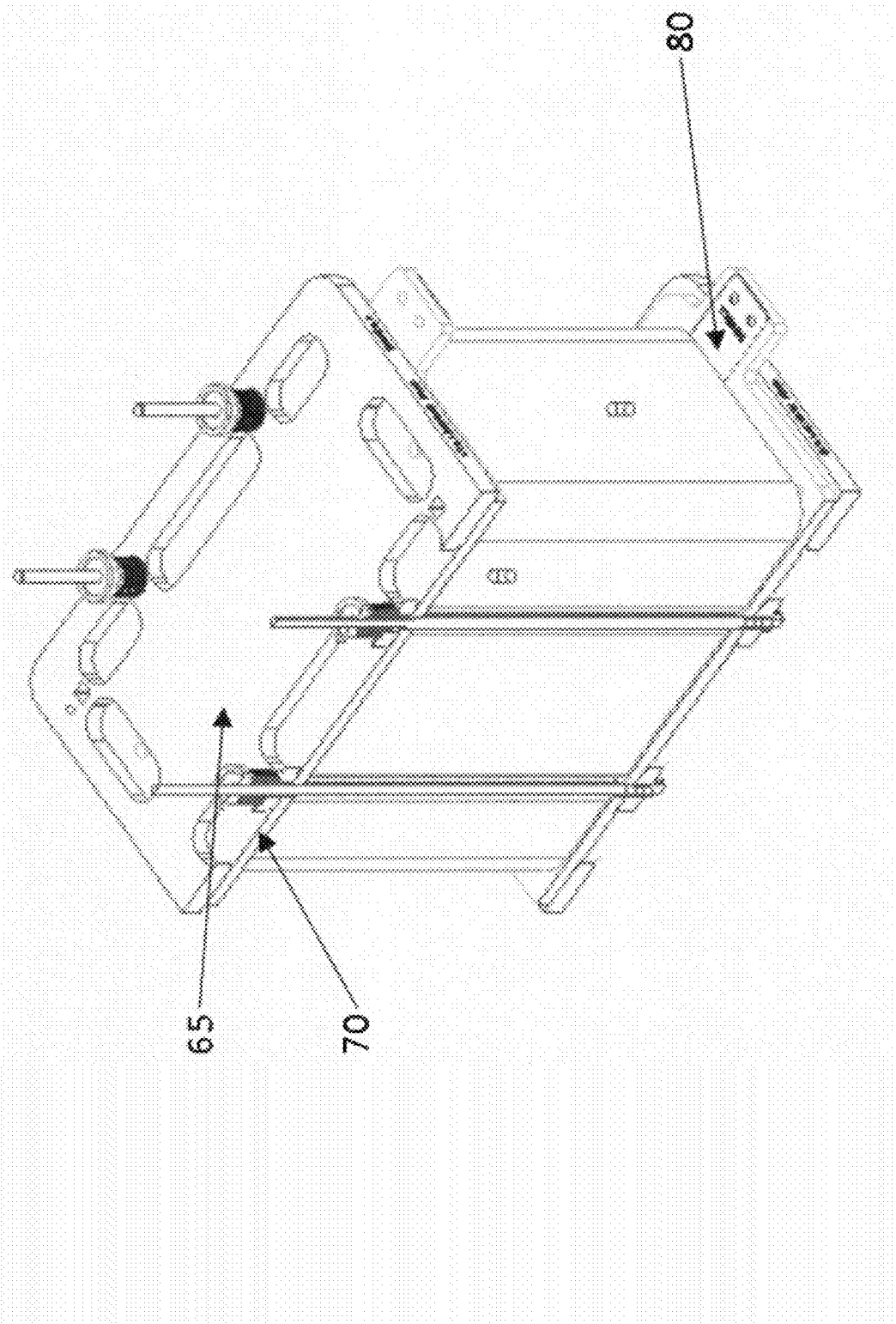
FIG. 4 is side perspective cross-sectional view of the fuel cell stack of FIG. 2.

FIG. 2 depicts fuel cell stack 20 of FIG. 1 with a cover removed. Structural end plates 60 are located at opposite ends of stack 20. An end 71 of stack 20 may include a first end plate 65 of structural end plates 60, an insulator plate 70, a collector plate 80 and as depicted in FIGS. A gasket (not shown) and membrane electrode assembly 117 may be located adjacent an interior side 95 of insulator plate 70. Fuel cell system 10 may include multiple instances of the membrane electrode assembly separated from each other (e.g., via Bipolar Plates (BPP)) and configured such that the last cells in the stack are electrically connected to collector plates (e.g., collector plate 80) at opposite ends of fuel cell stack 20. The voltage and electrical current are generated by oxidant and fuel being supplied to fuel cell 10 and the membrane electrode assembly thereof.

Figure 5:
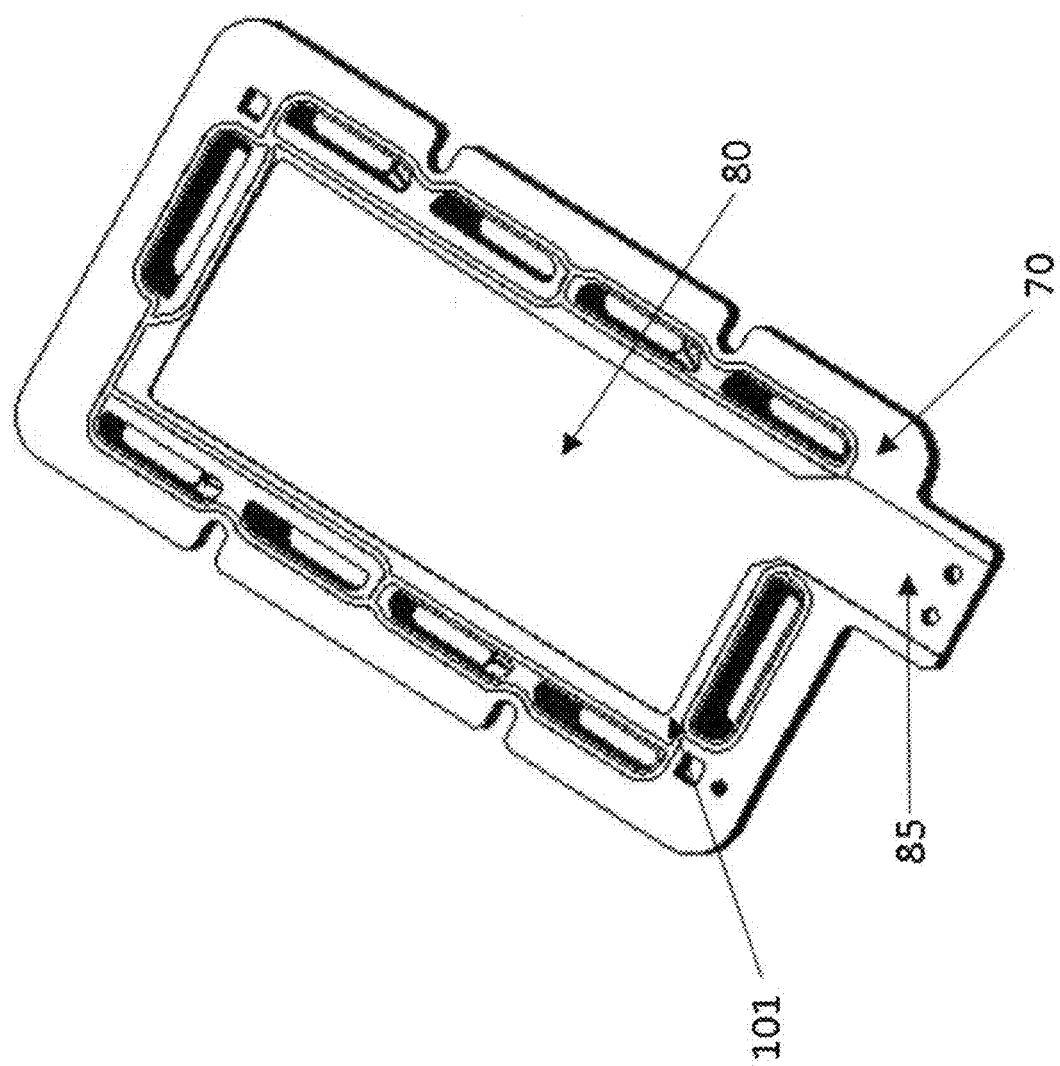
FIG. 5 is a perspective view of an insulator plate of the fuel cell stack of FIG. 2 receiving a collector plate.

Insulator plate 70 may be formed (e.g., by molding or additive manufacturing/3-D printing) of a thermoplastic or other material (e.g., glass, ceramic, thermoset) that would electrically insulate collector 80 from end plate 60. The material forming the insulator plate may be both a good thermal insulator and an electrical isolator. Collector plate 80 may be formed of copper or another conductive material, such as gold, silver, or aluminum. Further, collector plate 80 may be formed with a base material, such as aluminum, plated with another material, such as gold. Insulator plate 70 may include a cavity or pocket 101 on an opposite side thereof relative to endplate 65 to receive collector plate 80 as depicted in FIG. 5.

Collector plate may also include an extension 85 (FIG. 5) extending outside the pocket in a direction parallel to a plane of collector 80 (i.e., perpendicular to the direction toward insulator plate 70) to connect collector plate 80 to system electrical connectors (e.g., cables, wires) so that power may be extracted from the fuel cell stack, or for monitoring stack performance. A "cooler blank" plate may be located on each end of a fuel cell stack endplate assembly and does not usually have channels for reactants and typically functions to provide a structural end to the endplate assembly As indicated above, the components of fuel cell stack may be compressed to provide a desirable amount of GDL compression and minimize a potential for leakage of fuel cell fluids. The gasket loading of a gasket of the GDL must be adequate to seal around ports and at the same time not be excessive in order to prevent cracking of components (e.g., insulator plate 70, cooler blank plate 90) of a fuel cell stack under such compression. Collector plate 80 (FIGS. 1-4) may be a 1.0 mm copper collector plate having a thickness tolerance of +/−0.04 mm.

The importance of adequate compression to prevent leaks, by adequate gasket loading for example, is indicated above. Compression of stack 20 may be provided by a plurality of fasteners (e.g., bolts). As depicted in FIGS. 2-4, 9-10 and 12, for example, fasteners such as bolts 100 (e.g., four bolts 100) may be applied to an outside surface 66 of first endplate 65 and connected to an opposite endplate 62 such that the bolts may be tightened and a load applied to the components of fuel cell stack 60 to provide adequate compression. Such fasteners could also be rods, clips, and straps.

In prior art fuel cell stacks, the use of bolts or other fasteners to hold a fuel cell stack under adequate compression may require that that a structural endplate be high in weight and volume to limit the maximum deflection of the endplate to a small number, such as 0.005", to minimize the deflection and resulting leakage or other failure of the components of the fuel cell stack. For example, if a structural endplate does not have enough weight and volume to minimize deflection, portions of the endplate away from the fasteners may deflect upwardly or away from the interior of the fuel cell stack due to the large load required to achieve adequate compression on the fuel cell stack. Longitudinal and lateral ends most distant from such fasteners may be at a most risk of deflection.

Figure 7:
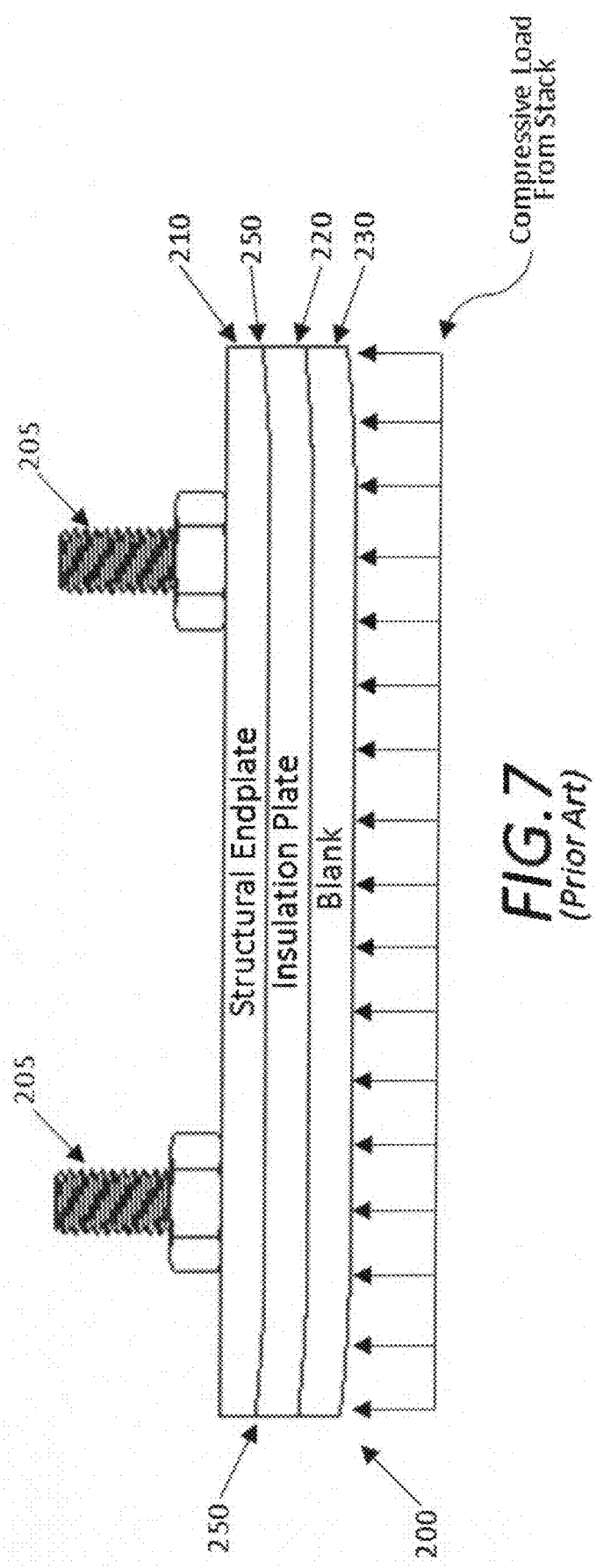
FIG. 7 is a block diagram side view of a prior art endplate assembly.

An example of a prior art endplate assembly 200 is shown as a block diagram in FIG. 7 with an inadequate weight, thickness or volume, or otherwise unable to provide adequate compression with a given number, type and compression of fasteners. A structural endplate 210 is held against an insulator plate 220 which abuts a blank 230 (or other component) adjacent a MEA (not shown) and a remainder of a fuel cell stack (not shown) with a compression load being applied against blank 230 from the remainder (non-depicted) portion of the fuel cell stack by fasteners 205 holding the depicted and non-depicted components. Deflections 250 (shown exaggerated for illustrative purposes) of structural plate 210 may occur in areas farther from the fastener location (e.g., laterally relative to an axial direction of the fastener). These deflections result from less compression of the plates in areas lateral from the fasteners relative to areas near the fasteners. Such deflection of the structural plate causes a contact point between the structural plate (e.g., structural plate 210) and the insulator plates (e.g. insulator plate 220), on either end of the stack, to not be parallel. This creates uneven compression of the stack components. This uneven compression results in leaks or other failures of the fuel cell stack components (e.g., at the locations of the deflections). To avoid this failure in the prior art structural plates are designed to be very thick. Although this limits the deflection described above, such a design also results in very heavy and large stacks.

Figure 11:
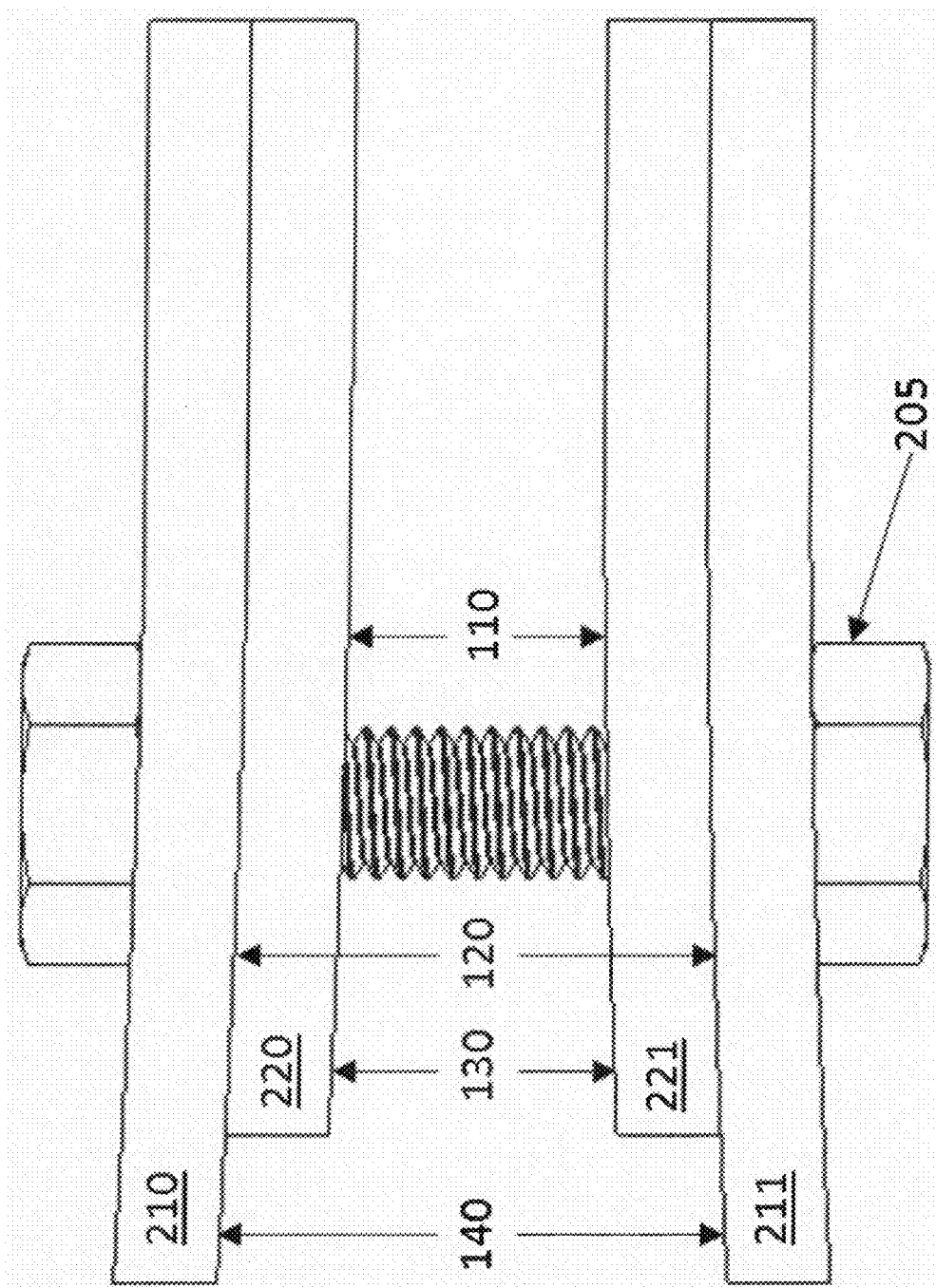
FIG. 11 is a block diagram side view of a portion of the prior art endplate of FIG. 7 with a membrane electrode assembly omitted.

FIG. 11 depicts a portion of FIG. 7 showing a left end of endplate assembly 200 including structural endplate 210 held against insulator plate 220 but omitting blank 230 and showing endplate 210 and plate 220 having exaggerated staggered lengths relative to each other. An opposite endplate 211 and an opposite insulator plate 221 are spaced from structural endplate 210 and insulator plate 220 about an MEA (not depicted). As shown, a distance 140 between structural endplate 210 and opposite structural endplate 211 is greater than a second distance 120 further toward an interior portion of endplate 220 due to the deflection described above. Similarly, a distance 130 between insulator 220 and opposite insulator 221 is greater than an interior distance 110 between insulator 220 and opposite insulator 221 due to the described deflection.

In another undepicted example of a prior art fuel cell endplate assembly, if only two fasteners were used to hold the endplate assembly together along with a relatively thin structural end plate, a deflection of the ends of the endplate of over 0.125" could occur. Such an end plate may be about five times thinner than would be required for such endplate to avoid deflection. The ends of such structural end plate could elastically deform upward (away from a remainder of the stack) over 0.125". Such a deflection should be held to less than 0.005" such that a deflection of over 0.125" is over 25 times the allowable deflection when loaded. The exceedance of such allowable deflection may cause inadequate compression in the areas in the ends that are deflected.

Figure 6:
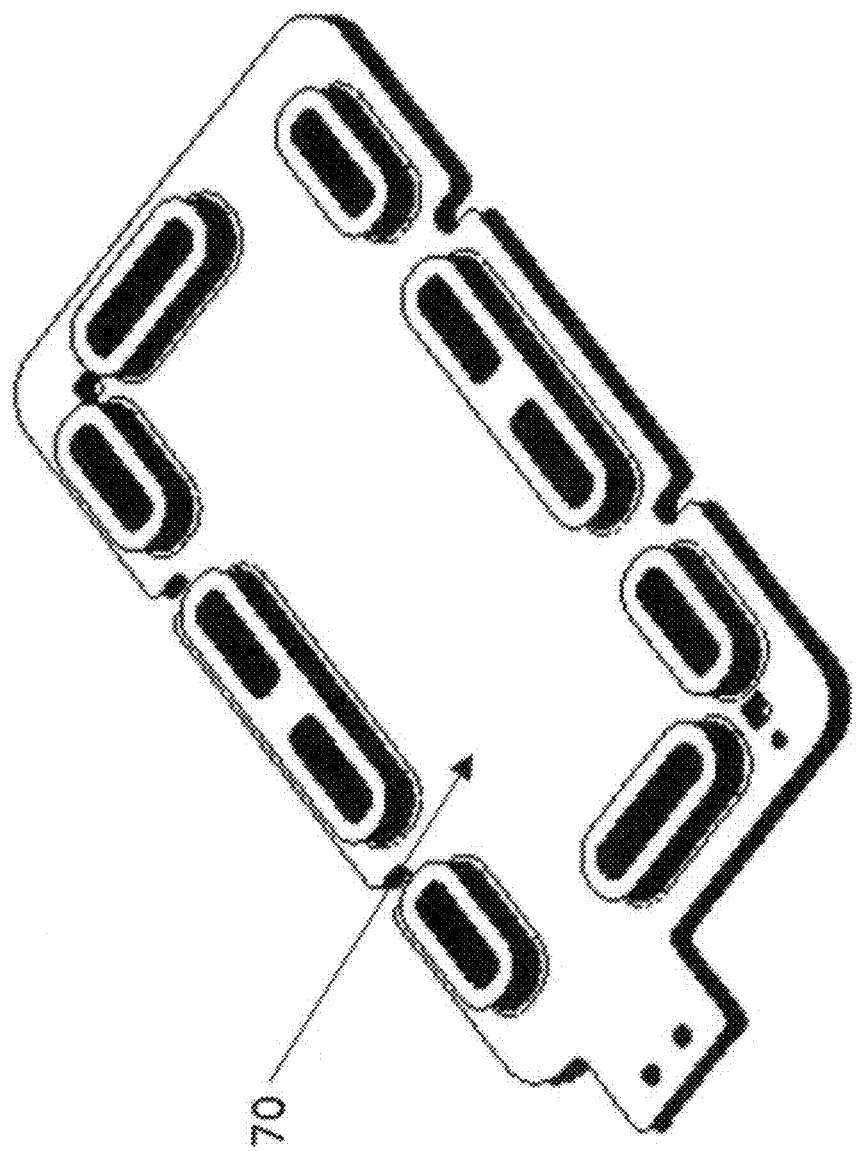
FIG. 6 is a perspective view of an insulator plate of the fuel cell stack of FIG. 2.
Figure 8:
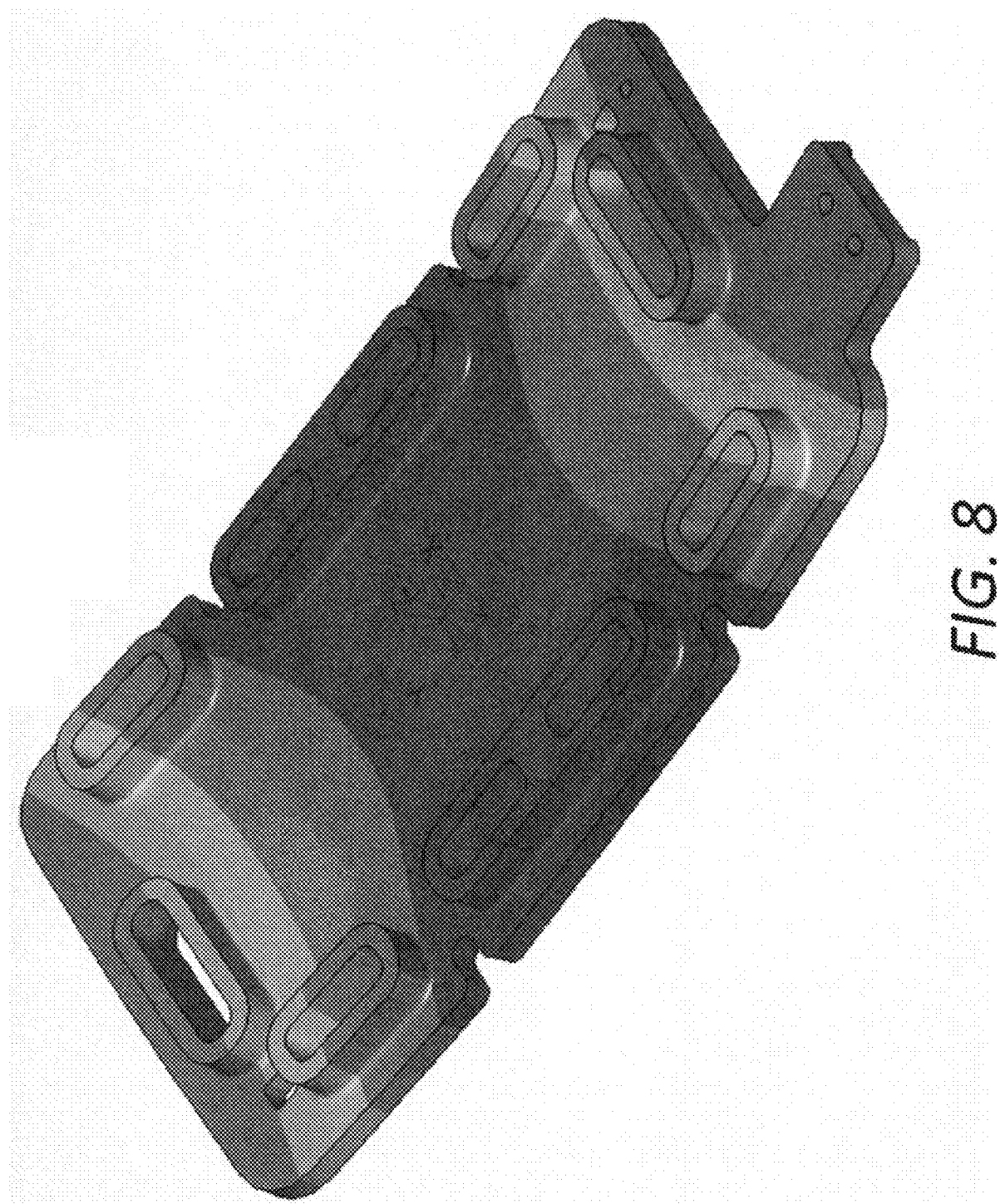
FIG. 8 is side perspective view of the insulator plate of FIG. 6 showing the results of finite element analysis.

FIG. 8 depicts insulator plate 220 separated from assembly 200 with longitudinal ends curved upwardly in a direction away from a remainder of the assembly when the insulator plate is assembled as depicted in FIG. 6. A finite element analysis may be run on the components of the assembly including the stresses and resulting deflection on the insulation plate and structural endplate. FIG. 8 depicts these various deflection in different colors or shades of black & white to show the various deformations or deflections of portions of the plate. The deflections come from the stresses applied to the part and FEA is used to predict precise deflection. This deflection along a surface creates a contour of surface.

Figure 9:
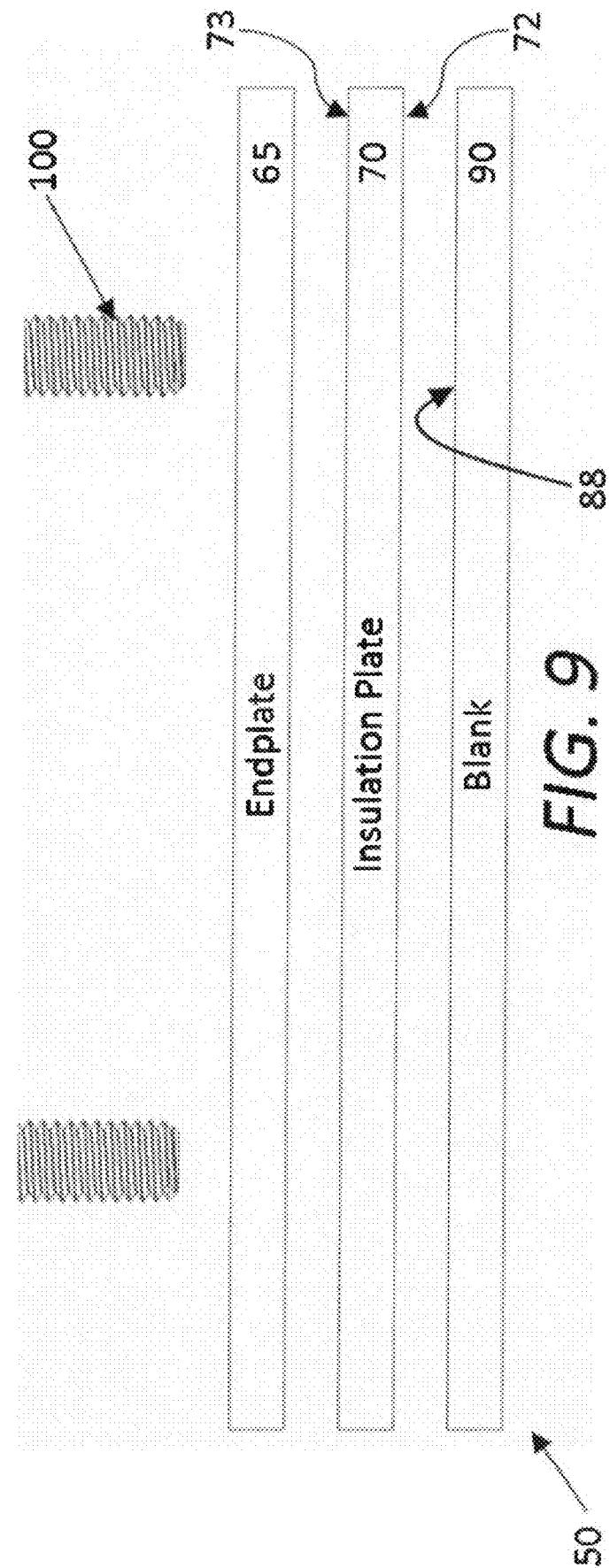
FIG. 9 is a block diagram exploded side view of an endplate assembly of the fuel cell stack of FIG. 1.

An exploded view of an endplate assembly 50 of fuel cell stack 20, shown as a block diagram, is depicted in FIG. 9 including first end plate 65 of structural end plates 60, insulator plate 70 and a cooler blank 90. Collector plate 80 may be located between insulator plate 70 and cooler blank 90 but is not visible in this view. Insulator plate 70 may be located between endplate 65 and cooler blank 90 or another plate or component closer to a membrane electrode assembly (MEA) (not shown) than to an end 71 of fuel cell stack 20. A bottom surface 72 of insulator plate 70 may abut cooler blank 90 or another component opposite endplate 65 relative to insulator plate 70.

Figure 10:
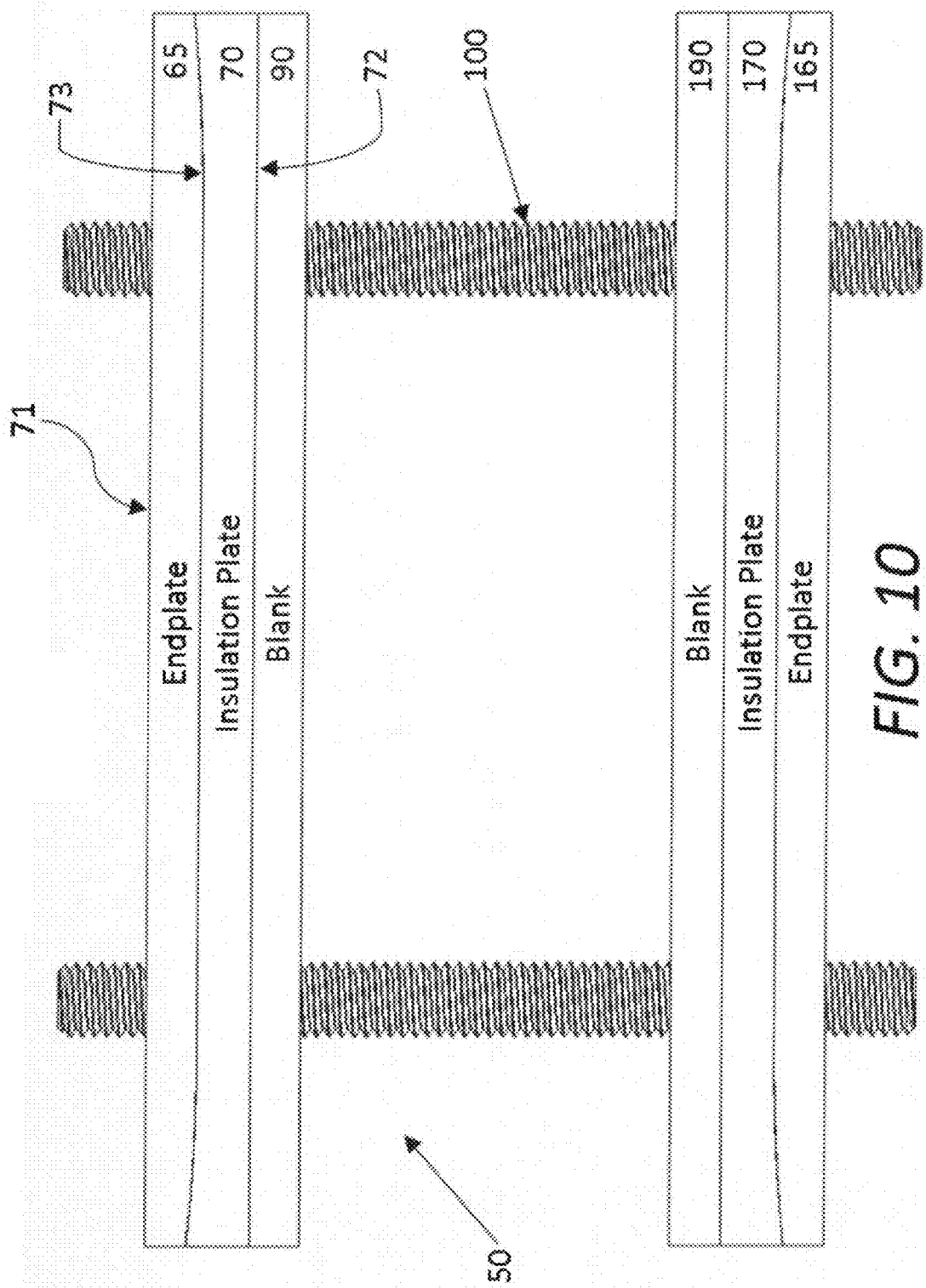
FIG. 10 is a block diagram side view of an endplate assembly of the fuel cell stack of FIG. 1 with a membrane electrode assembly omitted.

FIG. 10 depicts endplate assembly 50 including structural endplate 65 held against insulator plate 70 and blank 90 abutting insulator plate 90. An opposite endplate 165, an opposite insulator plate 170, and an opposite blank 190 are spaced from structural endplate 65 and insulator plate 70 about an MEA (not depicted). A compression load is applied by fasteners, such as bolts 100, holding the depicted and non-depicted components.

As shown in FIGS. 9-10, bottom surface 72 may be flat and parallel to a top surface 88 of blank 90 in longitudinal and lateral directions about perpendicular to a longitudinal dimension of fuel cell stack 20. A top surface 73 may include portions that are not flat and are non-parallel in longitudinal and lateral directions relative to bottom surface 72 as depicted in FIG. 10. Top surface 73 may be contoured or curved in one or more directions to avoid spaces between the components and failure of the stack as described above relative to deflections 250 of assembly 200.

Top surface 73 may be shaped based on finite element analysis performed on fuel cell stack 20, as described above relative to analysis performed on assembly 200 and depicted relative to insulation plate 220 in FIG. 8. Such finite element analysis may result in insulator plate 70 having various thicknesses in a direction parallel to a longitudinal dimension of fuel cell stack 20 such that any potential deflection of components (e.g., endplates 60) of fuel cell stack 20 may be accommodated by forming insulator plate 70 (e.g., by molding or 3-D printing) to allow top surface 73 to substantially continuously abut endplate 65 in longitudinal and lateral directions. The formation of insulator plate 70 having various thicknesses to form a shape based on the finite element analysis will maintain even compression of stack components by maintaining parallel surfaces between insulator plates. This will minimize or prevent leakage of fuel cell stack fluid and/or minimize or prevent other potential failure modes due to deflection of the components of fuel cell stack 20 due to the localized stress caused by bolts 100 applied to endplate 65. As indicated the fasteners may extend through the stack and may be connected to opposite endplate 62 of endplates 60 to maintain the components of fuel cell stack 20 under an adequate compression load to allow proper operation.

Insulator plate 70 may be molded (e.g., via injection or compression molding) to form the shape thereof including top surface 73 and may be formed of thermoplastics using injection molding such as ultem, or Acetel. It may also be formed using compression molding using materials such as ester resin or epoxy based thermal set resin. Insulator plate can also be formed using 3-D printing and thermoplastics, such as Acetel or Ultem.

Further, the forming of insulator plate 70 in a shape based on a potential deflection such that the plate takes into account localized deflections caused by fasteners holding the fuel cell together may allow endplates 60 to be made thinner (relative to an insulator plate having flat parallel surfaces on top and bottom sides thereof) along a longitudinal dimension of the fuel cell since the endplate does not need to maintain the components of the stack in a particular location or orientation due the force provided by the endplate itself against the insulator plate and resulting pressure on the other components of the fuel cell stack. The endplate thus does not need to be strong or thick enough to transmit these forces. Instead, the curved nature of top surface 73 of insulator plate 70 may be shaped to allow a bottom surface 67 of structural endplate 65, which is deflected due to the localized load provided by the fasteners, to continuously abut top surface 73 of insulator plate 70 such that the force provided by the fasteners and endplates does not need to be strong and thick enough to transmit force to prevent deflection (so as to minimize the risk of leakage an failure due to such deflection) and instead the forces may be transmitted via the fasteners to endplate 65 and insulator plate 70 that are configured (e.g., shaped and dimensioned) to transmit the forces through the plates as deflected to maintain appropriate compression without needing to also prevent deflection of the plates.

Figure 12:
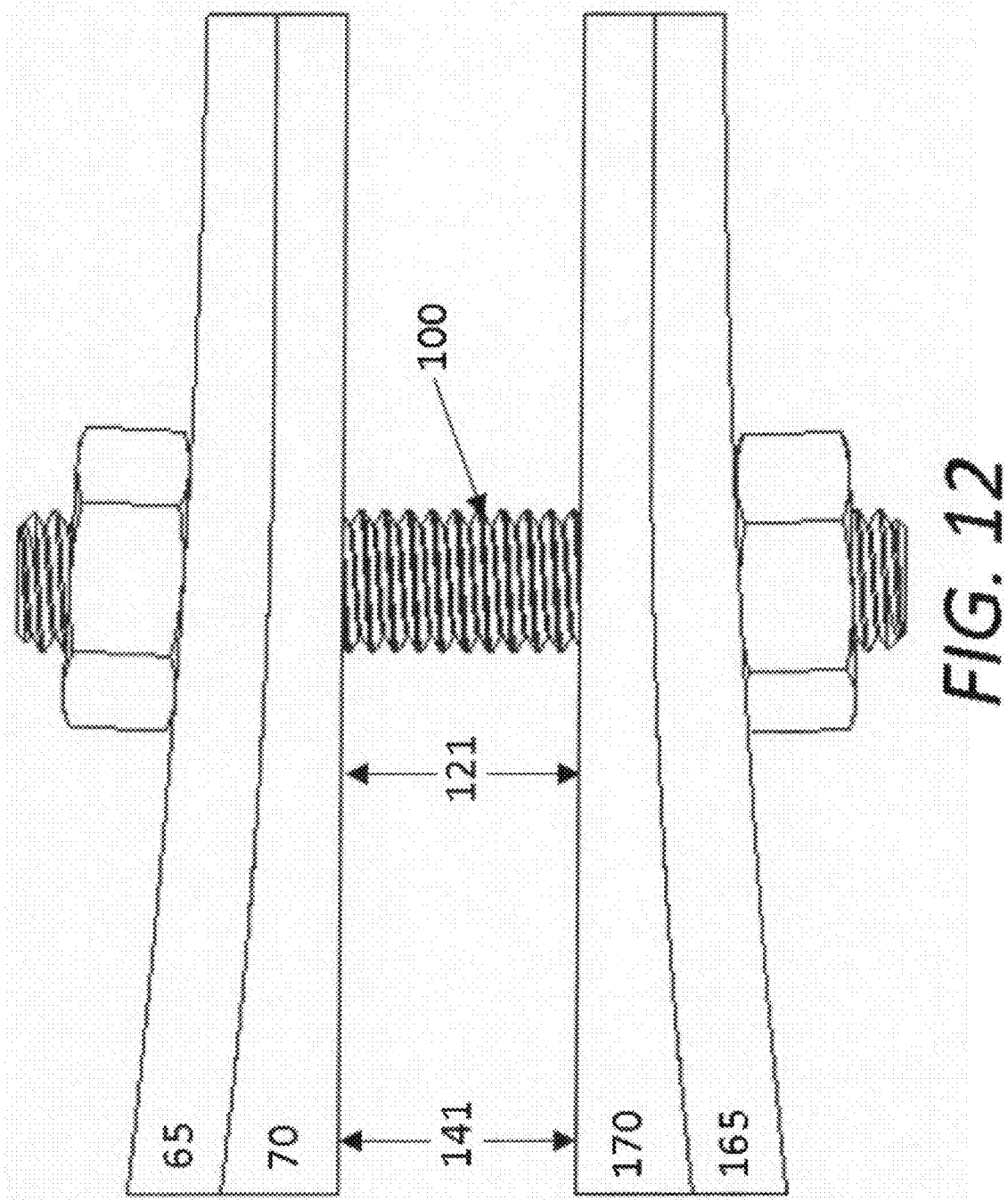
FIG. 12 is a block diagram side view of a portion of the endplate assembly of FIG. 10.

FIG. 12 depicts a portion of FIG. 10 showing a left end of endplate assembly 50 including structural endplate 65 held against insulator plate 70 but omitting blank 90. Opposite endplate 165 and opposite insulator plate 170 are spaced from structural endplate 65 and insulator plate 70 about an MEA (not depicted). Blank 190 is not shown for the sake of clarity. As shown, a distance 141 between structural endplate 211 and opposite structural endplate 211 is about equal to a second distance 121 further toward an interior portion of endplate 220 in contrast to the difference described above between length 120 and length 140 due to the deflection described above. This lack of deflection is due to the forming of insulator plate 70 to form a shape based on the finite element analysis to maintain even compression of stack components by maintaining parallel surfaces between insulator plates.

Thus, the formation of insulator plate 70 based on a finite element analysis allows the size and weight of the end hardware (e.g., endplates 60) to be decreased relative to the prior art while simultaneously decreasing the amount of deflection the plates (e.g., endplates 60) will experience when compressed. The formation of insulator plate 70 in this manner may be done with multiple fasteners and complex geometries. As the plate pitch and weight becomes more power dense, the end hardware (e.g., endplates 60) becomes a significant influence on the overall stack weight and volume. Allowing excessive deflection in the structural endplate (e.g., by forming insulator plate as described above) while still maintaining a flat surface at the current collector (e.g., on bottom surface 72 of insulator plate 70) may enable smaller, lighter and more robust sealing stacks. Further, when using thin foil bipolar plates the percentage of the weight and size of the stack coming from end hardware is significant compared to a stack made with machined graphite bi-polar plates or molded composite plates.

Returning to FIG. 1, an electrical demand by a load 60, for example, an industrial electric vehicle (e.g., an electrically powered forklift truck), or any other load, such as any electric device, light bulb, radio, electric heater, or fan motor, may be connected to the energy storage device 30 and fuel cell stack 20 in parallel by an electrical connection 35. Depending on the demand, power may flow from energy storage device 30, fuel cell 20 or both to the load. In times of high demand in excess of the maximum power output of the fuel cell 20, power may flow from both the fuel cell 20 and energy storage device 30 to load 60. In times of low demand, power may flow to load 60 from fuel cell 20, while excess power from the fuel cell 20 may flow into energy storage device 30 to recharge energy storage device 30 when required. In the case of loads that can source power, such as regenerative braking, power may flow from "load" 60 to energy storage device 30.

The controller (i.e., controller 180) described above, could be any type of computing unit (e.g., a personal computer operating a WINDOWS operating system or Apple OSX operating system, a Unix system, a microprocessor (which may or may not utilize a BIOS or operating system) or a mobile computing device such as a tablet computer or smart phone) configured to communicate with and/or control a fuel cell (fuel cell 20), temperature sensors located on portions of the fuel cell including the plates thereof, an energy storage device (e.g., energy storage device 30), a balance of a plant, a fuel supply (e.g., a source of oxidants or fuel), a fan (e.g., fan 40), a blower (e.g., blower 50) and/or a load (e.g., load 60). Further, the controller (e.g., controller 180) could be a unit separate from the sensors, fan, blower, fuel cell stack, energy storage device, and load device. Moreover, such a controller could be part of one or more of these components (e.g., the sensors, fan, blower, fuel cell, load device, and energy storage device) or could be distributed between these devices and other connected systems, such as the balance of plant while the distributed portions of such controller could be coupled to each other to allow communication therebetween.

The load (e.g., load 60) described above could be any type of stationary or moveable load device, such as an industrial electrical vehicle or forklift truck. The fuel cell (e.g., fuel cell stack 20) could be any type of fuel cell such as a proton exchange membrane fuel cell, solid oxide fuel cell, or any other fuel cell as would be known by one of ordinary skill in the art. The energy storage device (e.g., energy storage device 30) described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference will now be made to embodiments of the invention and specific language will be used to describe the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated an protected.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for forming a fuel cell endplate system comprising:
   performing a finite element analysis on a first fuel cell endplate system of a fuel cell stack having a structural endplate, an insulator plate, and a third plate secured to each other by a plurality of fasteners applied to said structural endplate to provide a desired compression to the fuel cell stack to determine stresses on the first fuel cell endplate system;
   forming a second insulator plate to conform to contours found by the finite element analysis on the structural endplate such that an exterior surface of the second insulator plate has a shape that conforms to an interior surface of the structural endplate;
   assembling a second endplate assembly by securing the structural endplate, the second insulator plate, and the third plate by a second plurality of fasteners applied to the structural endplate;
   the exterior surface being contoured such that the exterior surface is concave and has ends lateral to a fastener of the second plurality of fasteners extending longitudinally outwardly, relative to a longitudinal dimension of the fastener and away from a remainder of the exterior surface, the exterior surface non-parallel relative to a second interior surface of the second insulator plate opposite the exterior surface and contacting an exterior surface of the third plate.

2. A method for forming a fuel cell endplate system comprising;
   assembling an endplate assembly by connecting a structural endplate, a second insulator plate, and a third plate to each other by a plurality of fasteners applied to the structural endplate;
   the structural endplate having a first exterior surface and a first interior surface located on an opposite surface of said endplate relative to said first exterior surface;
   the insulator plate having a second exterior surface contacting said first interior surface of said structural endplate and a second interior surface on an opposite surface of said insulator plate relative to said second exterior surface;
   the third plate having a third exterior surface contacting said second interior surface and a third interior surface on an opposite side of said third plate relative to said insulator plate;
   the third interior surface and said third exterior surface being substantially flat such that said third interior surface and said third exterior surface are about parallel to each other;
   said second interior surface and said third exterior surface contacting each other substantially continuously in a longitudinal direction and a lateral direction such that said second interior surface and said third exterior surface are flat and substantially parallel to each other;
   said second exterior surface being contoured such that said second exterior surface is concave and has ends lateral to a fastener of the plurality of fasteners extending longitudinally outwardly relative to a longitudinal dimension of the fastener and away from a remainder of said second exterior surface, said second exterior surface non-parallel relative to said third interior surface;
   applying a force on the structural endplate by the fastener of the fasteners to deflect the structural endplate such that the first interior surface substantially continuously abuts the second exterior surface in longitudinal and lateral directions, the force maintaining the stack under an adequate compression load to allow proper operation.

3. The method of claim 2 further comprising fasteners holding said structural endplate against said second exterior surface such that said second exterior surface is substantially parallel to said first interior surface.

4. The method of claim 3 wherein said second exterior surface and said first interior surface are in substantially continuous contact with each other along substantially the entire width dimension and an entire length dimension of said second exterior surface and said first interior surface.

5. The method of claim 2 wherein said second interior surface and said third exterior surface are in substantially continuous contact with each other along an entire width dimension and an entire length dimension of said second interior surface and said third exterior surface.

6. The method of claim 2 wherein said second exterior surface is concave and receives said first interior surface.

* * * * *